United States Patent
Bakke et al.

(10) Patent No.: US 7,127,602 B1
(45) Date of Patent: *Oct. 24, 2006

(54) ISCSI COMPUTER BOOT SYSTEM AND METHOD

(75) Inventors: Mark Bakke, Maple Grove, MN (US); Edward A. Soltis, Elk River, MN (US); Pawlo P. Prawdiuk, St. Paul, MN (US); Charles Steven Rissmeyer, Coon Rapids, MN (US)

(73) Assignee: Cisco Technology, Inc., San Jose, CA (US)

( * ) Notice: Subject to any disclaimer, the term of this patent is extended or adjusted under 35 U.S.C. 154(b) by 426 days.

This patent is subject to a terminal disclaimer.

(21) Appl. No.: 10/371,909

(22) Filed: Feb. 21, 2003

(51) Int. Cl.
*G06F 9/00* (2006.01)

(52) U.S. Cl. .......................................... 713/2; 709/222
(58) Field of Classification Search .................... None
See application file for complete search history.

(56) References Cited

U.S. PATENT DOCUMENTS

| | | | | |
|---|---|---|---|---|
| 5,996,024 A | * | 11/1999 | Blumenau | 719/326 |
| 6,105,130 A | * | 8/2000 | Wu et al. | 713/2 |
| 6,434,695 B1 | * | 8/2002 | Esfahani et al. | 713/2 |
| 6,609,151 B1 | * | 8/2003 | Khanna et al. | 709/222 |
| 6,857,069 B1 | * | 2/2005 | Rissmeyer et al. | 713/2 |
| 2003/0097553 A1 | * | 5/2003 | Frye, Jr. | 713/2 |
| 2003/0126242 A1 | * | 7/2003 | Chang | 709/222 |
| 2004/0138868 A1 | * | 7/2004 | Kuznetsov et al. | 703/25 |
| 2004/0153694 A1 | * | 8/2004 | Nicholson et al. | 714/4 |

* cited by examiner

*Primary Examiner*—Lynne H. Browne
*Assistant Examiner*—Fahmida Rahman
(74) *Attorney, Agent, or Firm*—Schwegman, Lundberg, Woessner & Kluth

(57) ABSTRACT

A pre-boot Execution Environment (PXE) boot extension provides a TCP/IP interface via a network interface card of the computerized system. SCSI commands are transported over the TCP/IP connection to provide access to a bootable operating system stored on a second networked computerized system, and the networked computerized system is booted from the bootable operating system stored on the second networked computerized system via the SCSI commands transported over the TCP/IP connection.

19 Claims, 2 Drawing Sheets

ISCSI COMPUTER BOOT SYSTEM AND METHOD

FIELD OF THE INVENTION

The invention relates generally to booting computers, and more specifically to a system and method for booting a computer using iSCSI.

BACKGROUND OF THE INVENTION

Computers traditionally use built-in code known as a BIOS (Basic Input/Output System) to perform initial boot functions and to control certain attached devices before loading an operating system or other software. This enables a computer to receive input from a keyboard and to output data to a display, and further provides the computer with control of devices such as serial communications ports and disk drives.

When booting, a personal computer typically either executes the BIOS from ROM or flash memory, or loads the BIOS into RAM and executes the BIOS code from RAM to perform initial testing, configuration, and to initialize loading an operating system. Although operating systems are traditionally loaded from hard disks or diskette drives, BIOS extensions such as the PXE or Preboot eXecution Environment provide a computer system the ability to establish a network connection before loading an operating system, and to boot over the network connection via a network bootstrap program. Various other BIOS extensions provide the ability to boot via USB or other interfaces.

The various diskless boot options discussed here require a computer system to have a specialized network interface card or a customized system BIOS, and so are somewhat difficult to implement in existing systems or with off-the-shelf parts. A boot option enabling a computer system having neither a custom network interface card nor a custom system BIOS is therefore desirable.

SUMMARY OF THE INVENTION

The present invention provides in one embodiment a system and method of loading a Pre-boot Execution Environment (PXE) boot extension providing a TCP/IP interface via a network interface card of the computerized system. SCSI commands are transported over the TCP/IP connection to provide access to a bootable operating system stored on a second networked computerized system, and the networked computerized system is booted from the bootable operating system stored on the second networked computerized system via the SCSI commands transported over the TCP/IP connection.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

Figure 1:
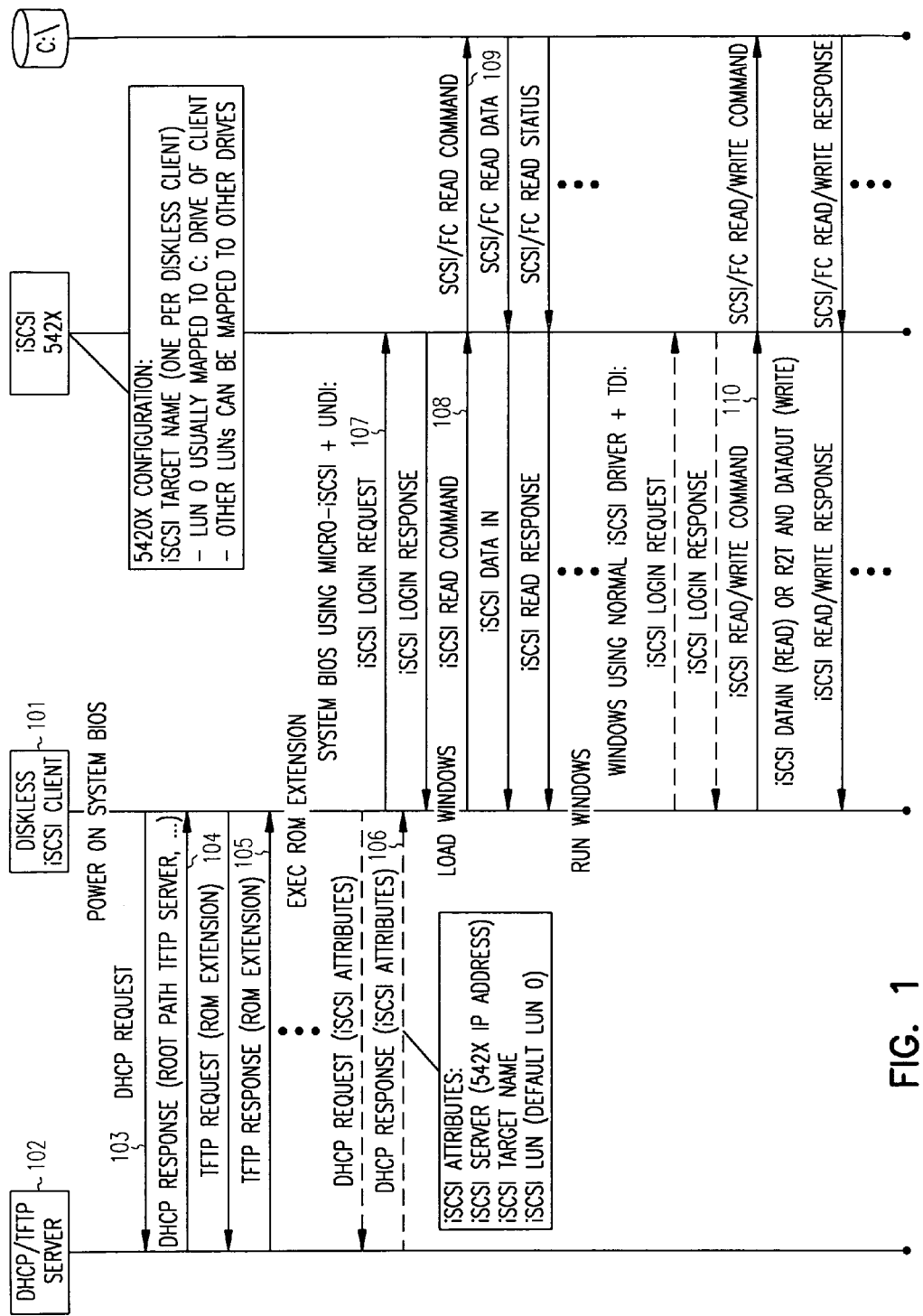
FIG. 1 shows a diagram illustrating the boot sequence of a diskless iSCSI client, consistent with an embodiment of the present invention.

FIG. 1 shows a diagram illustrating the boot sequence of a diskless iSCSI client, consistent with an embodiment of the present invention. The diskless iSCSI client shown here is but one example of a computerized device that can boot from storage media accessed across a network using the method of the present invention.

In this example, the diskless iSCSI client 101 requests boot information from DHCP server 102 at 103, and receives a response at 104. The DHCP server returns information including the client's IP address and default router at 104, the TFTP server and filename of the ROM extension to be loaded at 105, and iSCSI attributes such as the iSCSI device IP address, iSCSI target name, and logical unit number (LUN) at 106. The diskless client further uses its built-in TFTP to download the ROM extension from a TFTP server at 105, which in this example is also server 102 but in various embodiments can be any networked server.

With this information loaded in the diskless client 101, the ROM extension downloaded from the TFTP server is executed and intercepts INT13 disk operations from the diskless client's BIOS, turning them into iSCSI calls through a micro-iSCSI stack loaded as part of the ROM extensions. Universal Network Device Interface (UNDI) drivers in the client's BIOS facilitate communication with the network adapter, which provide the network interface for the iSCSI network communications.

The diskless iSCSI client 101 then logs in to the remote device providing a network interface to the intended boot device at 107, and loads the operating system boot loader, drivers, and other related data at 108 and 109. Here, the client also loads a second iSCSI driver that is operating system-specific, which will replace the iSCSI driver loaded earlier.

Once the operating system and drivers are loaded, the operating system boot loader starts the operating system and the operating system takes over control of the diskless iSCSI device 101.

When loading, the operating system boot loader accesses the root drive through the first or micro-iSCSI driver initially loaded, and loads registry settings, configuration files, and other drivers. This step is used to load the operating system network stack and iSCSI driver so that control can be transferred from the micro-iSCSI driver and UNDI driver. Once the network stack and operating system-specific iSCSI drivers are loaded and started, the BIOS-level micro iSCSI driver and the UNDI driver are no longer used. The operating system reconnects to the iSCSI boot device using the operating system's iSCSI and network drivers. The operating system is then loaded and fully operational, and is capable of performing iSCSI disk operations to the boot volume or other volumes via the second or operating system-specific iSCSI driver interface as shown at 110.

In various embodiments of the invention the operating system may be any operating system, including Microsoft Windows and UNIX, including Unix versions such as Linux, AIX, or Sun UNIX. Although the various devices shown in FIG. 1 are identified using various names, the various computerized systems and servers may take any form, including routers, networked appliances, set top boxes, telecommunications equipment, or any other form consistent with the invention as claimed in the appended claims.

Figure 2:
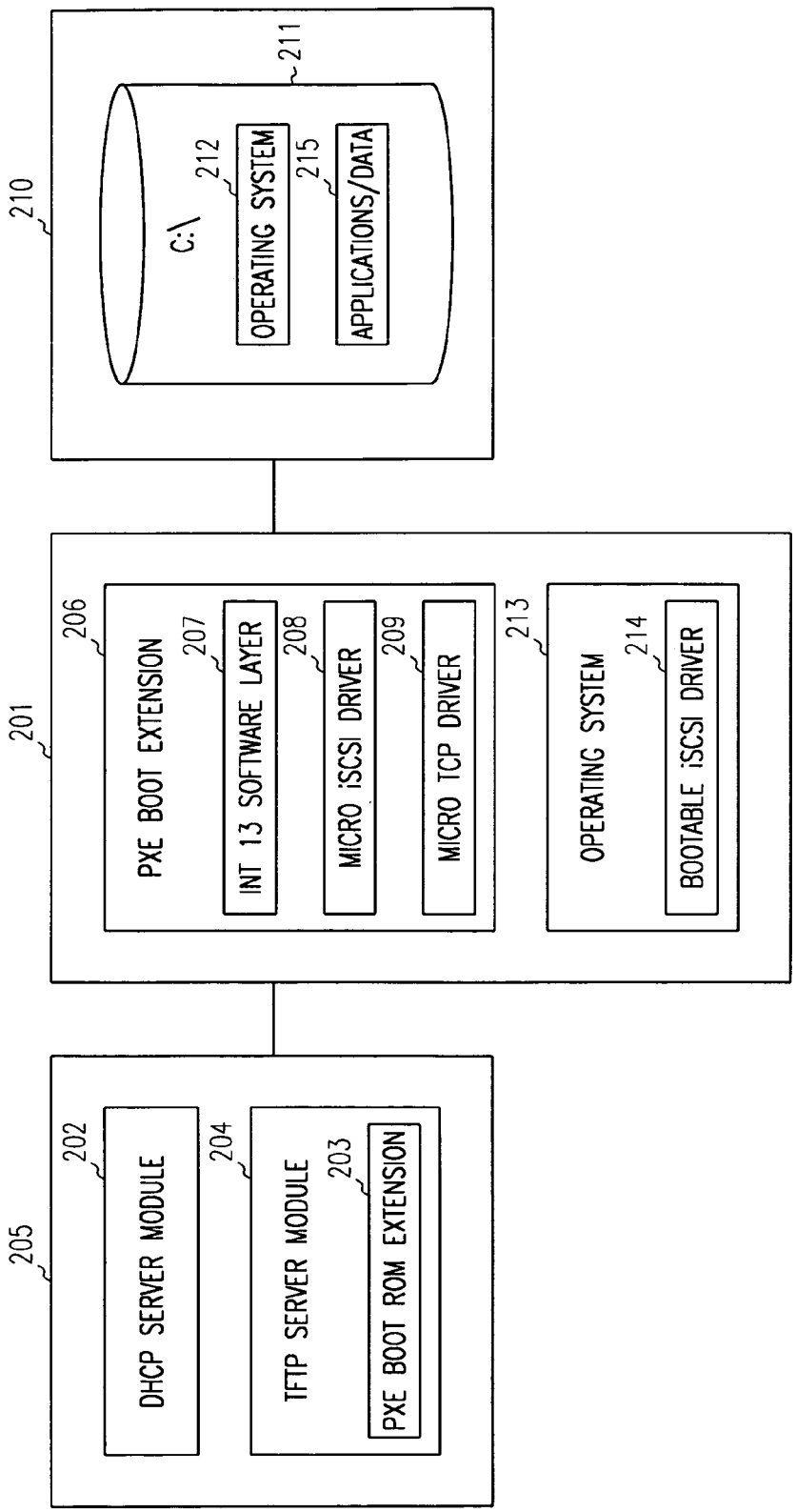
FIG. 2 shows a diagram illustrating a computerized system configuration consistent with an embodiment of the present invention.

FIG. 2 shows a diagram illustrating a computerized system configuration consistent with an embodiment of the present invention, and explains in greater detail the operation of one embodiment of the invention.

A computerized networked device 201 comprises a system BIOS (Basic Input/Output System) that in one embodiment uses a built-in UNDI (Universal Network Device Interface) driver operating in its PXE (Pre-boot eXecution Environment) to request boot information from a DHCP server 202. The DHCP server returns the boot information to the computerized networked device 201, including device 201's IP address and default router, TFTP server and PXE boot ROM extension filename and server, and the target iSCSI boot device's device IP address, iSCSI target name, and LUN (Logical Unit Number).

The device 201 then uses its built-in TFTP extension to download the appropriate PXE boot ROM extension 203 from the TFTP server 204 identified by the DHCP server 202. In this example, the DHCP server module 202 and the TFTP server module 204 exist within the same computerized networked device 205, but in other embodiments will exist in different networked computerized devices.

The downloaded PXE boot extension 206 comprises an INT13 software layer 207 that is operable to intercept INT13 calls and convert them to iSCSI read and write commands, and to use the micro-iSCSI driver 208 and micro TCP driver 209 to send the iSCSI commands to computerized network device 210 which contains the boot volume 211. The device 201 loads the operating system boot loader from the operating system 212 stored on the boot volume 211, and boots the operating system as shown at 213. A bootable iSCSI driver 214 is also loaded, and is specific to the operating system. When the operating system starts the operating system-specific network drivers, the bootable iSCSI driver 214 begins to use the normal iSCSI path operating through the operating system-specific network and bootable iSCSI drivers.

The method and systems described here do not require special hardware to operate and require only standard protocols including DHCP, TFTP and iSCSI. In one embodiment, two pieces of software are provided to enable operation, which are the PXE boot ROM extension and the bootable iSCSI driver loaded in the booting operating system.

The bootable iSCSI driver 214 is in the embodiment of the invention shown in FIG. 2 distinct from a traditional iSCSI driver in its structure, which includes modules providing specific functions. A multiplexing layer receives SCSI commands from a SCSI port driver, and determines how to route the received command. If the operating system network drivers are loaded and enabled, the normal iSCSI path using the operating system network drivers is used. If the operating system network drivers are not loaded and enabled but the PXE UNDI or other network drivers are available, the micro-iSCSI driver is used along with the micro-TCP driver. If neither driver is yet loaded, the request is rejected.

The normal iSCSI path is also provided in this example embodiment via the bootable iSCSI driver 214, and handles all iSCSI requests once the operating system network driver is active and enabled. The micro-iSCSI path is used only when the operating system network drivers are not yet loaded and enabled, and is used between the time when the system is first powered on and when the operating system network drivers are loaded and enabled. It uses the micro-iSCSI 208 and micro-TCP 209 drivers from the PXE boot ROM extension 209 to allow the operating system to access the boot volume 211 before the normal operating system network services are available.

Once booted, the networked device 201 will be operable via the normal iSCSI channel to access the volume 211, including applications and data at 215. The device 201 will also be able to access other volumes via iSCSI just as a traditional computerized system may access more than one directly attached SCSI device, so that it may access applications and other data from volumes other than boot volume 211. It is desired in this embodiment of the invention that each networked device 201 have its own boot volume 211, just as each traditional computer has its own boot volume, so that configuration, registry, swap, and other files and configuration settings unique to each computer are not overwritten by other computerized systems.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

The invention claimed is:

1. A method of booting a networked computerized system comprising:
   loading a Pre-boot Execution Environment (PXE) boot extension providing a TCP/IP interface via a network interface card, wherein the PXE boot extension comprises a ROM extension loaded from a network attached server via PXE, and wherein the ROM extension comprises a first iSCSI driver operable to transport SCSI commands over the TCP/IP connection;
   transporting SCSI commands over the TCP/IP connection to provide access to a bootable operating system stored on a second networked computerized system;
   booting the networked computerized system from the bootable operating system stored on the second networked computerized system via the SCSI commands transported over the TCP/IP connection; and
   loading a second iSCSI driver within the bootable operating system, the second iSCSI driver loaded as an operating system driver upon booting the operating system.

2. The method of claim 1, wherein the network interface card is an Ethernet network interface card.

3. The method of claim 1, wherein the first iSCSI driver comprises a micro-iSCSI driver.

4. The method of claim 1, wherein the PXE boot extension comprises a micro-TCP driver.

5. The method of claim 1, wherein the ROM extension comprises a software layer that intercepts INT13 calls and converts them to corresponding SCSI commands.

6. The method of claim 1, further comprising:
   loading the second iSCSI driver and a network stack within the bootable operating system; and
   transferring network interface and SCSI control of the networked computerized system from the PXE boot extension to the operating system.

7. The method of claim 1, wherein the operating system is Microsoft Windows (tm).

8. The method of claim 1, wherein the operating system is Linux.

9. A networked computerized system comprising:
a network interface card;
a Pre-boot Execution Environment (PXE) boot extension providing a TCP/IP interface via the network interface card, wherein the PXE boot extension comprises a ROM extension loaded from a network attached server via PXE;
a first iSCSI driver operable to transport SCSI commands over the TCP/IP connection to provide access to a bootable operating system stored on a second networked computerized system;
a software module operable to boot the networked computerized system from the bootable operating system stored on the second networked computerized system via the SCSI commands transported over the TCP/IP connection; and
a second iSCSI driver within the bootable operating system, the second iSCSI driver loaded as an operating system driver upon booting the operating system.

10. The networked computerized system of claim 9, wherein the network interface card is an ethernet network interface card.

11. The networked computerized system of claim 9, wherein the first iSCSI driver comprises a micro-iSCSI driver.

12. The networked computerized system of claim 9, wherein the PXE boot extension comprises a micro-TCP driver.

13. The networked computerized system of claim 9, wherein the ROM extension comprises a software layer that intercepts INT13 calls and converts them to corresponding SCSI commands.

14. The networked computerized system of claim 9, wherein the ROM extension comprises the first iSCSI driver operable to transport SCSI commands over the TCP/IP connection to provide access to the bootable operating system stored on the second networked computerized system.

15. The networked computerized system of claim 9, further comprising:
the second iSCSI driver and a network stack loaded within the bootable operating system; and
a software module operable to transfer network interface and SCSI control of the networked computerized system from the PXE boot extension to the operating system.

16. The networked computerized system of claim 9, wherein the operating system is Microsoft Windows (tm).

17. The networked computerized system of claim 9, wherein the operating system is Linux.

18. A method of booting a networked computerized system comprising:
loading a Pre-boot Execution Environment (PXE) boot extension from a networked server comprising:
a software module that intercepts INT13 calls and converts them to SCSI read and write commands;
a micro-iSCSI driver operable to send SCSI read and write commands over a TCP/IP connection; and
a micro-TCP stack providing a TCP implementation for the micro-iSCSI driver;
transporting SCSI commands over the TCP/IP connection to provider access to a bootable operating system stored on a second networked computerized system via the micro-iSCSI driver and micro-TCP stack;
booting the networked computerized system from the bootable operating system stored on the second networked computerized system via the SCSI commands transported over the TCP/IP connection;
loading an operating system-specific iSCSI driver and a network stack within the bootable operating system; and
transferring network interface and SCSI control of the networked computerized system from the PXE boot extension to the operating system.

19. A networked computerized system, comprising:
a Pre-boot Execution Environment (PXE) boot extension loaded from a networked server comprising:
a software module that intercepts INT13 calls and converts them to SCSI read and write commands;
a micro-iSCSI driver operable to send SCSI read and write commands over a TCP/IP connection; and
a micro-TCP stack providing a TCP implementation for the micro-iSCSI driver;
the PXE boot extension operable to transport SCSI commands over the TCP/IP connection to provide access to a bootable operating system stored on a second networked computerized system via the micro-iSCSI driver and micro-TCP stack; and
a software module operable to boot the networked computerized system from the bootable operating system stored on the second networked computerized system via the SCSI commands transported over the TCP/IP connection, booting the networked computerized system comprising:
loading an operating system-specific iSCSI driver and a network stack within the bootable operating system; and
transferring network interface and SCSI control of the networked computerized system from the PXE boot extension to the operating system.

* * * * *